United States Patent [19]

Metzger et al.

[11] Patent Number: 5,046,857
[45] Date of Patent: Sep. 10, 1991

[54] PLASTIC THERMAL PROBE ASSEMBLY WITH PRESS FIT SENSOR

[75] Inventors: John R. Metzger, Cortland; George R. Smith, Mineral Ridge, both of Ohio

[73] Assignee: General Motors Corporation, Detroit, Mich.

[21] Appl. No.: 527,482

[22] Filed: May 23, 1990

[51] Int. Cl.⁵ .................. G01K 13/02; G01K 7/22; G01K 1/08
[52] U.S. Cl. .................. 374/135; 374/208; 374/183; 374/185; 338/28; 338/22 R
[58] Field of Search ............ 374/135, 208, 183, 185, 374/209; 338/28, 22 R

[56] References Cited

U.S. PATENT DOCUMENTS

| | | | |
|---|---|---|---|
| 2,798,893 | 7/1957 | Winkler | 374/135 |
| 2,849,518 | 8/1958 | MacDonald | 374/135 |
| 3,061,806 | 10/1962 | Stevens | 374/185 |
| 3,186,227 | 6/1965 | Barlow | 374/183 |
| 3,221,555 | 12/1965 | Biber | 374/183 |
| 4,243,968 | 1/1981 | Scott | 338/28 |
| 4,246,787 | 1/1981 | Harper | 338/22 R |
| 4,318,073 | 3/1982 | Rossler, Jr. | 338/28 |
| 4,420,738 | 12/1983 | Rehmann et al. | 338/28 |
| 4,453,835 | 6/1984 | Clawson et al. | 374/185 |
| 4,454,370 | 6/1984 | Voznick | 374/208 |
| 4,485,263 | 11/1984 | Itoyama et al. | 374/208 |
| 4,575,705 | 3/1986 | Gotcher | 374/183 |
| 4,587,931 | 5/1986 | Duprez | 123/41.15 |
| 4,841,274 | 6/1989 | Yagher, Jr. et al. | 374/208 |
| 4,842,419 | 6/1989 | Nietert | 374/208 |
| 4,891,622 | 1/1990 | Llewellyn | 338/22 R |
| 4,959,633 | 9/1990 | Kiraly et al. | 338/22 R |

FOREIGN PATENT DOCUMENTS

| | | | |
|---|---|---|---|
| 0314427 | 12/1988 | Japan | 374/208 |
| 2203554 | 10/1988 | United Kingdom | 374/183 |

*Primary Examiner*—William A. Cuchlinski, Jr.
*Assistant Examiner*—Diego F. F. Gutierrez
*Attorney, Agent, or Firm*—F. J. Fodale

[57] ABSTRACT

A thermal probe has a premolded single unitary plastic outer shell forming an open end adapted to receive a connector unit and having an inboard end defining a probe portion. The plastic outer shell has deformable walls forming a bore. A pair of terminals and wire leads connected to a thermistor have a plastic mounting member premolded thereon; the plastic mounting member is slideably press fit in the bore to position the thermistor within the bore and to axially locate the thermistor in spaced relationship to the inboard end of the outer shell. Side segments on the terminals extend outwardly of the plastic member and are embedded in the deformable walls of the bore to interlock the thermistor in place within the outer shell.

16 Claims, 2 Drawing Sheets

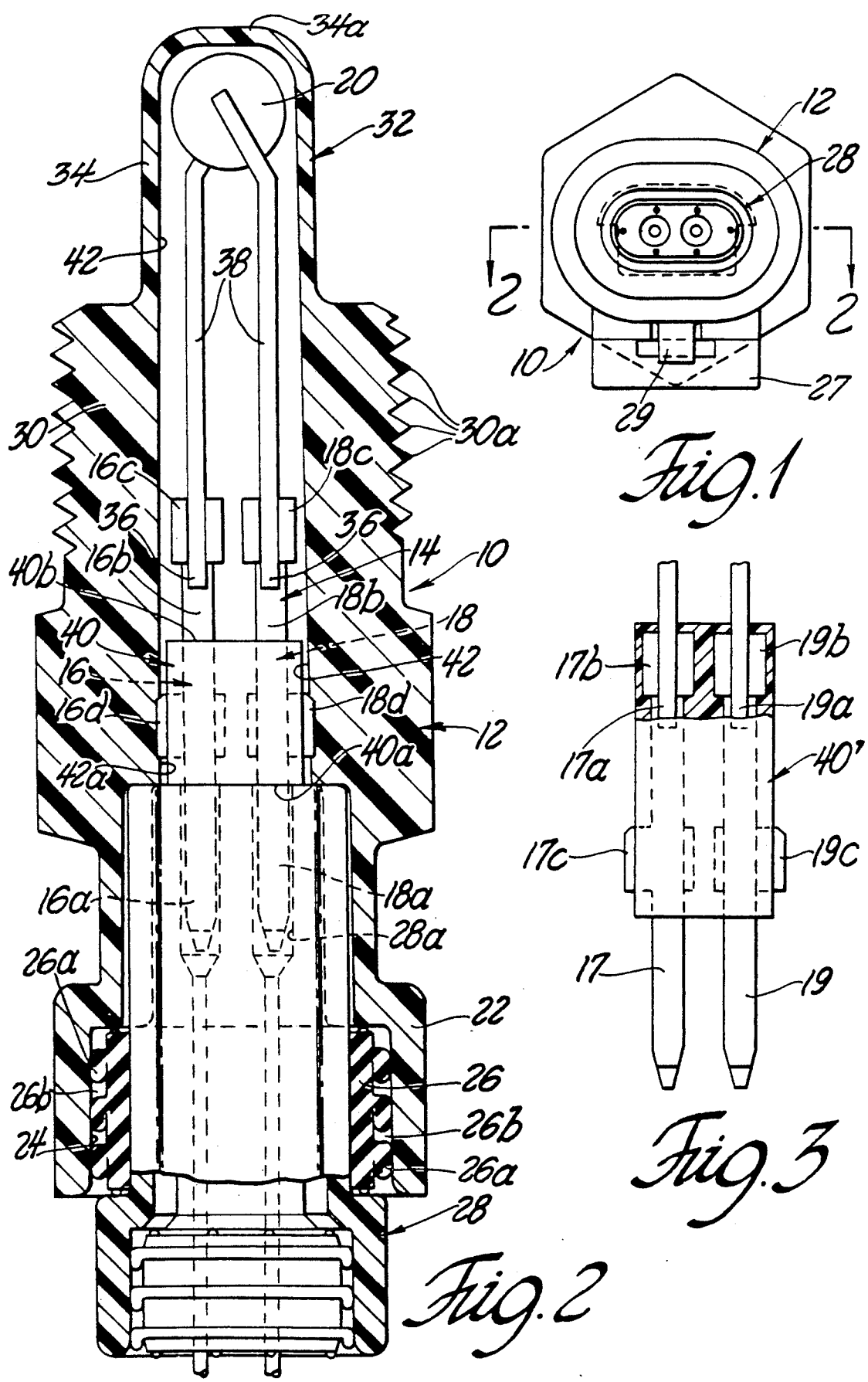

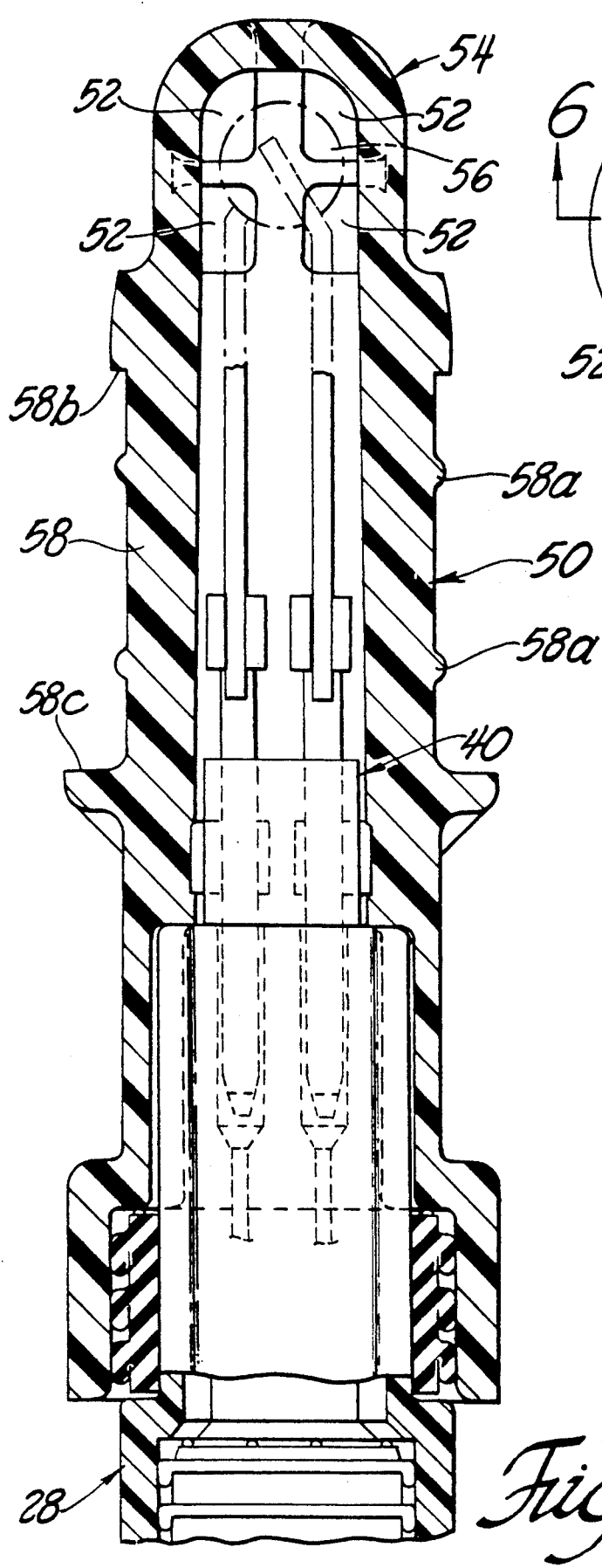
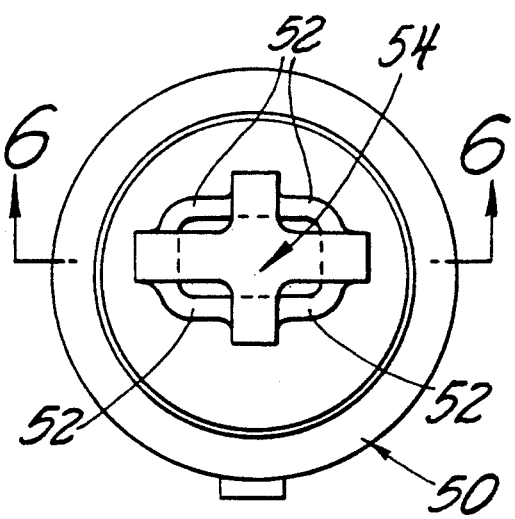
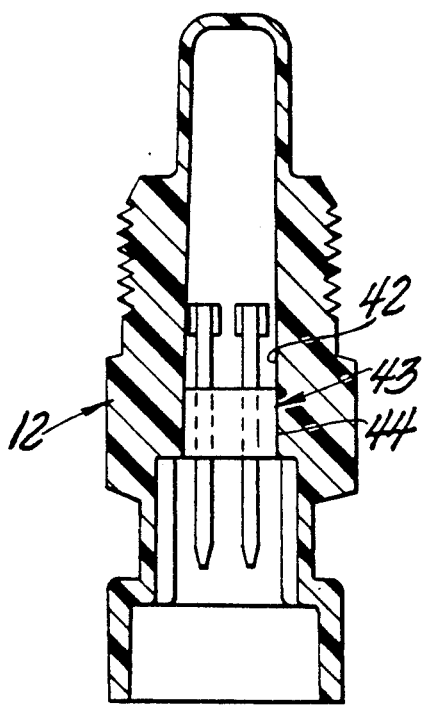

5,046,857

PLASTIC THERMAL PROBE ASSEMBLY WITH PRESS FIT SENSOR

FIELD OF THE INVENTION

This invention relates to thermal probe assemblies and more particularly to thermal probe assemblies having a probe portion and a body portion enclosing a pair of terminals connected to the wire leads of a thermistor positioned to sense the temperature of fluid directed over the probe portion.

BACKGROUND OF THE INVENTION

Various thermal probe assemblies are known in which a probe portion encloses a thermistor for sensing the temperature of a medium in heat transfer relationship with the probe portion. One such assembly includes a metal outer shell that is crimped over a plastic connector cover. The plastic connector cover supports terminals welded to wire leads of a thermistor located within either a sealed probe portion on the metal outer shell in the case of a liquid temperature sensor, or in a plastic tube supported in the metal outer shell. The plastic tube has an open end for sensing gas temperature. A gasket is located between the connector cover and the crimped edge of the metal outer shell to environmentally seal the thermal probe assembly and a cardboard insulating shell is located between the thermistor and the metal shell to electrically insulate therebetween.

While satisfactory for their intended purpose such metal shell sensor assemblies are expensive to manufacture due to the large number of sub-components which must be individually positioned during the assembly process. Furthermore, the crimped edge that attaches the connector cover to the metal shell is a potential leakage path for contaminants into the interior of the probe if the sealing gasket is not properly compressed on assembly or if it takes a compression set in use.

Another type of probe assembly includes an all plastic housing. Such assemblies eliminate the need for crimping and sealing a metal shell to a plastic connector cover. Such plastic housings are made by a multishot, in place, over molding technique. Such techniques require elaborate molding apparatus to assure that the thermistor element remains properly centered and axially positioned with respect to the probe portion of the assembly as various mold layers are injected to form the housing. Furthermore, such probe assemblies have an overmold layer injected against solder joints formed between thermistor wire leads and the thermistor and/or the wire leads and metal terminals. Such plastic overmolding can impose high temperature and injection pressures on the solder joints to cause the solder to reflow so as to weaken the electrical connection between the thermistor and the terminals.

Furthermore, the interface between layers of over molded material is a potential leakage path for flow of contaminants into the interior of the probe assembly.

SUMMARY OF THE INVENTION

Accordingly a feature of the present invention is to provide a two piece easily assembled probe assembly that eliminates contaminant leakage paths to the operative components of the probe assembly.

Another feature of the present invention is to provide an externally sealed, two piece probe assembly including a single unitary, one piece high strength, high temperature injection molded thermoplastic shell having a probe portion on one end thereof and a connector receptacle on the opposite end thereof. A longitudinal bore in the shell slideably receives a preassembled terminal and thermistor unit; the receptacle defines a sealing surface for engagement with a sealing gasket on a connector unit.

Another feature of the present invention provides standard terminals and thermistors in a subsystem preformed with a mounting member that is sized to fit a wide range of different sized single unitary injection molded shell members having integral probe portions and integral mounting portions specially designed for differing applications.

An advantage of the present invention is that such standard terminals and thermistors can be joined by weld connections and premolded to a mounting member without reflowing solder joints during the manufacturing operation.

An object of the present invention is to provide an improved temperature responsive probe assembly including a pair of terminals adapted to be connected to an electrical connector and further including thermistor means having wire leads connected to the terminals, the thermistor means sensing the temperature of a medium in heat transfer relationship with the probe assembly; and wherein a premolded unitary one piece plastic shell has an open receptacle end and an opposite end defining a probe portion and means for retaining the plastic shell on a member for mounting the probe portion in heat exchange relationship with a medium whose temperature is to be sensed. The outer shell further includes a bore for containing the terminals and thermistor means connected to the terminals for sensing the temperature of the medium and for producing an electrical signal which varies in accordance with changes in the temperature of the medium; the plastic shell has deformable walls forming the bore therein; a mounting member is premolded to the terminals for slideably positioning the thermistor in the bore for axially locating the thermistor in spaced relationship to the probe portion; and interlock members extend from the mounting member and are engageable with the plastic shell as the mounting member is slideably positioned in the bore to deform the deformable walls so as to interlock the terminals on the plastic shell and for locating the thermistor in axially spaced relationship with the probe portion.

A further object of the present invention is to provide a thermal probe assembly as set-forth in the preceding object wherein the open receptacle end includes a surface in sealing engagement with an electrical connector. locatable within the open receptacle end for electrical connection to probe terminals.

A further object of the present invention is to provide a thermal probe assembly as set-forth in the preceding paragraph further characterized by the mounting member having an outside dimension which press fits within the bore for axially locating the thermistor with respect to the probe portion.

A still further object of the present invention is to provide a thermal probe assembly as set-forth in the preceding paragraph further characterized by a pair of metal terminals having side extensions thereon and a premolded member enclosing the pair of metal terminals and wherein the side extensions extend outwardly of the premolded member to engage the plastic shell at the bore to deform the deformable walls so as to interlock the terminals on the plastic shell and for locating the thermistor in axially spaced relationship with the probe portion.

Still another object of the invention is to provide the premolded member of the preceding thermal probe assemblies with opposite ends and arranging the terminals with pairs of end portions extending from each of the opposite ends; and welding one pair of the end portions to the wire leads of the thermistor.

These and other features, advantages and objects of the present invention will be more fully understood from the following description of the preferred embodiment when taken in conjunction with the accompanying drawings wherein:

BRIEF DESCRIPTION OF THE DRAWINGS

FIG. 1 is an end elevational view of the present invention;

FIG. 2 is a sectional view of a thermal sensor including the present invention taken along the line 2—2 of FIG. 1 looking in the direction of the arrows;

FIG. 3 is a enlarged view of a thermistor and terminal subassembly insertable into a shell component in FIG. 1;

FIG. 4 is a sectional view of a shell component of the assembly in FIG. 1 with another embodiment of a thermistor and terminal subassembly therein;

FIG. 5 is an end elevational view of another embodiment of the present invention for sensing gas temperature; and FIG. 6 is a sectional view taken along line 6—6 of FIG. 5.

DETAILED DESCRIPTION OF PREFERRED EMBODIMENTS OF THE PRESENT INVENTION

Referring now to FIGS. 1 and 2, a thermal sensor assembly 10 is illustrated. The assembly 10 includes a plastic shell 12 and a press fit subassembly 14 including a pair of terminals 16, 18 and a thermistor 20. The thermistor 20 senses the temperature of a medium and produces an electrical signal which varies in accordance with the sensed temperature.

More particularly, the plastic shell is a preformed part formed of a thermoplastic material which is molded at high temperatures and pressures to form a shell 12 having an open receptacle end 22 with an inner surface 24 adapted to sealingly engage the outer gasket 26 of a known connector assembly 28 having recessed female terminals 28a that are configured to electrically connect to the outboard ends 16a, 18a of the terminals 16, 18 of the subassembly 14. The remainder of the shell 12 is formed as a unitary one-piece member which is completely sealed so as to prevent fluid leakage into the interior of the sensor assembly 10 during its operation.

More specifically, the thermal sensor assembly 10 includes an integral mounting means 30 on the outer surface thereof. In the embodiment of FIG. 1, the mounting means 30 is a plurality of external threads 30a that are adapted to be threadably mated with a tapped hole in a member, e.g., an engine block. The thermal sensor assembly 10 is threaded into the block (or another manufacture having a medium therein whose temperature is to be sensed).

In accordance with one aspect of the invention the shell 12 has no break lines or overmolded portions which define interface regions through which fluids or contaminants can leak into the interior of the thermal sensor assembly 10. Specifically, to obtain such a fully sealed shell 12 in the embodiment of FIG. 1 the shell 12 further includes an integral closed end defining a probe portion 32 which has a thin wall 34 located in surrounding relationship to the thermistor 20. The probe portion 32 is adapted to lie within a fluid body whose temperature is to be sensed. The integral closed end defining the probe portion 32 is in injection molded at the same time as the mounting means 30 and at the same time as the open receptacle end 22. Consequently, the only interface joint is that formed between the connector unit 22 and the inner surface 24 at the receptacle end 22. This joint is positively sealed by the gasket 26 by several annular ribs 26a thereon that define multiple labyrinths 26b. An integral spring biased latch member 27 on connector 28 releasably engages a side rib 29 on the outer surface of the open receptacle end 22 to hold the electrical connector 28 in place on the thermal sensor assembly 10.

Another aspect of the present invention is the provision of a preassembled terminal and thermistor subassembly 14. The subassembly is initially formed by locating the terminals on a suitable jig so that the terminals 16 and 18 are located in spaced parallelism. The ends 36 of wire leads 38 from the thermistor 20 are welded to inboard ends 16b,18b of the terminals 16, 18. Each of the terminals 16, 18 further include a U-shaped end portion 16c, 18c which is also crimped over the wire leads 38 to further secure the wire leads 38 to the terminals 16, 18. A premolded mounting member 40 is formed around the terminals 16, 18 at the middle of the terminals 16, 18. The mounting member 40 has opposite ends 40a, 40b from which the terminal ends 16a, 18a and 16b, 18b extend.

Another embodiment of a subassembly 14 is shown in FIG. 3 wherein a pair of terminals 17, 19 are shown having a premolded mounting member 40' thereon to cover weld connections 17a, 19a between the wire leads of the thermistor. In this embodiment the mounting member 40' serves to bond the wire leads to U-shaped end portions 17b, 19b so as to eliminate the need for separate crimps.

Furthermore, another feature of the invention is that the terminals 16, 18 have side extensions 16d, 18d thereon that extend beyond the side walls of the mounting member 40. Similar side extensions 17c, 19c are formed on terminal 17, 19. The side extensions 16d, 18d displace the wall surfaces 42a of a bore 42 in shell 12 to interlock the subassembly 14 at an axial location within the bore 42 in which the thermistor 20 is in close spaced relationship to a tip wall 34a of the probe portion 32. The undeformed surface 42 is shown in FIG. 4 and the deformation of the surface 42a is shown in FIG. 1.

Another alternative is to provide a dimension on the outer walls of a mounting member 43 which tightly fit in the bore 42 and are sonically welded at an interface 44 therebetween as shown in outline in FIG. 4.

The embodiment of the invention shown in FIG. is like that shown in FIGS. 1 and 2. In this embodiment the plastic shell is an integrally molded one piece member 50 having holes 52 formed in the probe end 54 thereof to expose the thermistor 20 to air temperature surrounding the end of a air temperature sensor 56. The one piece member 50 includes a mounting surface 58 thereon with annular sealing ribs 58a formed thereon at axially spaced locations on the member 50 between locating shoulders 58b and 58c.

The advantage of the present invention is that it eliminates the need for separate insulation sleeves and gaskets between a metal shell and a connector cover that is connected to the metal shell by crimping the shell into physical contact with the connector cover. The reliability of the unit is improved since there are no sealed interfaces in the shells 12, 50. A further advantage is that the subassembly 14 can be formed without overmolding a solder joint so as to adversely reflow a solder joint forming an electrical connection between the wire leads of the thermistor and the thermistor and/or the wire leads of the thermistor and the metal terminals.

Another major advantage of the present invention is that the subassembly 14 enables standard terminals and thermistors to be used in a variety of different applications requiring sensor assemblies having longer or shorter shells or greater or lesser diameters. In such cases, the subassembly 14 is easily modified for use in the different sized sensor assemblies merely by changing the lengths of the wire leads connecting the terminals to the thermistors, welding or crimping and welding the wire leads and premolding a suitably sized mounting member on the terminals.

The foregoing is a complete description of preferred embodiments of the present invention. It should be understood, however, that various changes and modifications may be made without departing from the spirit and scope of the present invention as set forth in the following claims.

The embodiments of the invention in which an exclusive property or privilege is claimed are defined as follows:

1. A temperature responsive probe assembly having a thermistor for sensing the temperature of a medium in heat transfer relationship with the probe assembly and for producing an electrical signal which varies in accordance with changes in the temperature of the medium; and a pair of terminals connected to the thermistor that are adapted to be connected to an electrical connector comprising in combination:
   a premolded unitary one piece plastic shell having an open receptacle end and an opposite end defining a probe portion and means for mounting the plastic shell on a member so that the probe portion is in heat exchange relationship with a medium whose temperature is to be sensed;
   the plastic shell further including a bore for containing the pair of terminals a premolded member, and the thermistor, the bore being formed by deformable walls of the plastic shell;
   a sub-assembly comprising the thermistor, the pair of terminals and the premolded mounting member formed around the pair of terminals;
   the sub-assembly being insertable into the bore of the plastic shell for positioning the thermistor in the bore of the plastic shell; and
   interlock means between the premolded mounting member and an inside surface of the plastic shell defining the probe for locking the pair of terminals to the plastic shell and for locating said thermistor in the plastic shell in spaced relationship with the probe portion;
   the pair of terminals having end portions extending from an end of the premolded mounting member for connection with an electrical connector pluggable into the receptacle end of the plastic shell.

2. The assembly of claim 1 wherein the premolded mounting member fits tightly within the bore for locating the thermistor with respect to the probe portion of the plastic shell.

3. The assembly of claim 1 wherein the open receptacle end includes surface means for sealing engagement with the electrical connector.

4. The assembly of claim 3 wherein the probe portion of the plastic shell is closed to seal the thermistor from the medium in heat exchange relationship with the probe portion.

5. The assembly of claim 1 wherein the thermistor has a wire leads and the pair of terminals have end portions extending from an opposite end of the premolded mounting member that are crimped and welded to the wire leads of the thermistor.

6. The assembly of claim 1 wherein the thermistor has wire leads and the pair of terminals have end portions that are welded to the wire leads of the thermistor and that are enclosed by the premolded mounting member.

7. The assembly of claim 1 wherein the probe portion of the plastic shell has openings to expose the thermistor to the medium in heat exchange relationship with the probe portion.

8. The assembly of claim 1 wherein the probe portion of the plastic shell is closed to seal the thermistor from the medium in heat exchange relationship with the probe portion.

9. A temperature responsive probe assembly having a thermistor for sensing the temperature of a medium in heat transfer relationship with the probe assembly and for producing an electrical signal which varies in accordance with changes in the temperature of the medium; and a pair of terminals connected to the thermistor that are adapted to be connected to an electrical connector comprising in combination:
   a premolded unitary one piece plastic shell having an open receptacle end and an opposite end defining a probe portion and means for mounting the plastic shell on a member so that the probe portion is in heat exchange relationship with a medium whose temperature is to be sensed;
   the plastic shell further including a bore for containing the pair of terminals and thermistor that is formed by deformable walls of the plastic shell;
   a sub-assembly comprising the thermistor, the pair of terminals and a premolded mounting member formed around the pair of terminals;
   the sub-assembly being insertable into the bore of the plastic shell for positioning the thermistor in the bore of the plastic shell; and
   the pair of metal terminals having side extensions that extend outwardly of the premolded mounting member and engage with the plastic shell at the bore therein to deform the deformable walls so as to lock the pair of terminals to the plastic shell and locate the thermistor in spaced relationship with the probe portion of the plastic shell.

10. A temperature responsive probe assembly having a thermistor for sensing the temperature of a medium in heat transfer relationship with the probe assembly and for producing an electrical signal which varies in accordance with changes in the temperature of the medium; and a pair of terminals connected to the thermistor that are adapted to be connected to an electrical connector, comprising in combination:
   a premolded unitary one piece plastic shell having an open receptacle end and an opposite end defining a probe portion and means for mounting the plastic shell on a member so that the probe portion is in heat exchange relationship with a medium whose temperature is to be sensed;

the plastic shell further including a bore for containing the pair of terminals and thermistor that is formed by deformable walls of the plastic shell;

a sub-assembly comprising the thermistor, the pair of terminals and a premolded mounting member formed around the pair of terminals;

the sub-assembly being insertable into the bore of the plastic shell for positioning the thermistor in the bore of the plastic shell; and the pair of metal terminals having side extensions that extend outwardly of the premolded mounting member and engage with the plastic shell at the bore therein to deform the deformable walls so as to lock the pair of terminals to the plastic shell and locate the thermistor in spaced relationship with the probe portion of the plastic shell.

11. The assembly of claim 10 wherein the pair of terminals have end portions extending from an end of the premolded mounting member for connection with an electrical connector plugable into the open receptacle end of the plastic shell and the open receptacle end includes surface means for sealing engagement with the electrical connector.

12. The assembly of claim 11 wherein the thermistor has wire leads and the pair of terminals have end portions extending from an opposite end of the premolded mounting member that are crimped and welded to the wire leads of the thermistor.

13. The assembly of claim 12 wherein the probe portion of the plastic shell is closed to seal the thermistor from the medium in heat exchange relationship with the probe portion.

14. The assembly of claim 11 wherein the thermistor has wire leads and the pair of terminals have end portions that are welded to the wire leads of the thermistor and that are enclosed by the premolded mounting member.

15. The assembly of claim 11 wherein the probe portion of the plastic shell has openings to expose the thermistor to the medium in heat exchange relationship with the probe portion.

16. The assembly of claim 11 wherein the probe portion of the plastic shell is closed to seal the thermistor from the medium in heat exchange relationship with the probe portion.

* * * * *